United States Patent Office 3,337,737
Patented Aug. 22, 1967

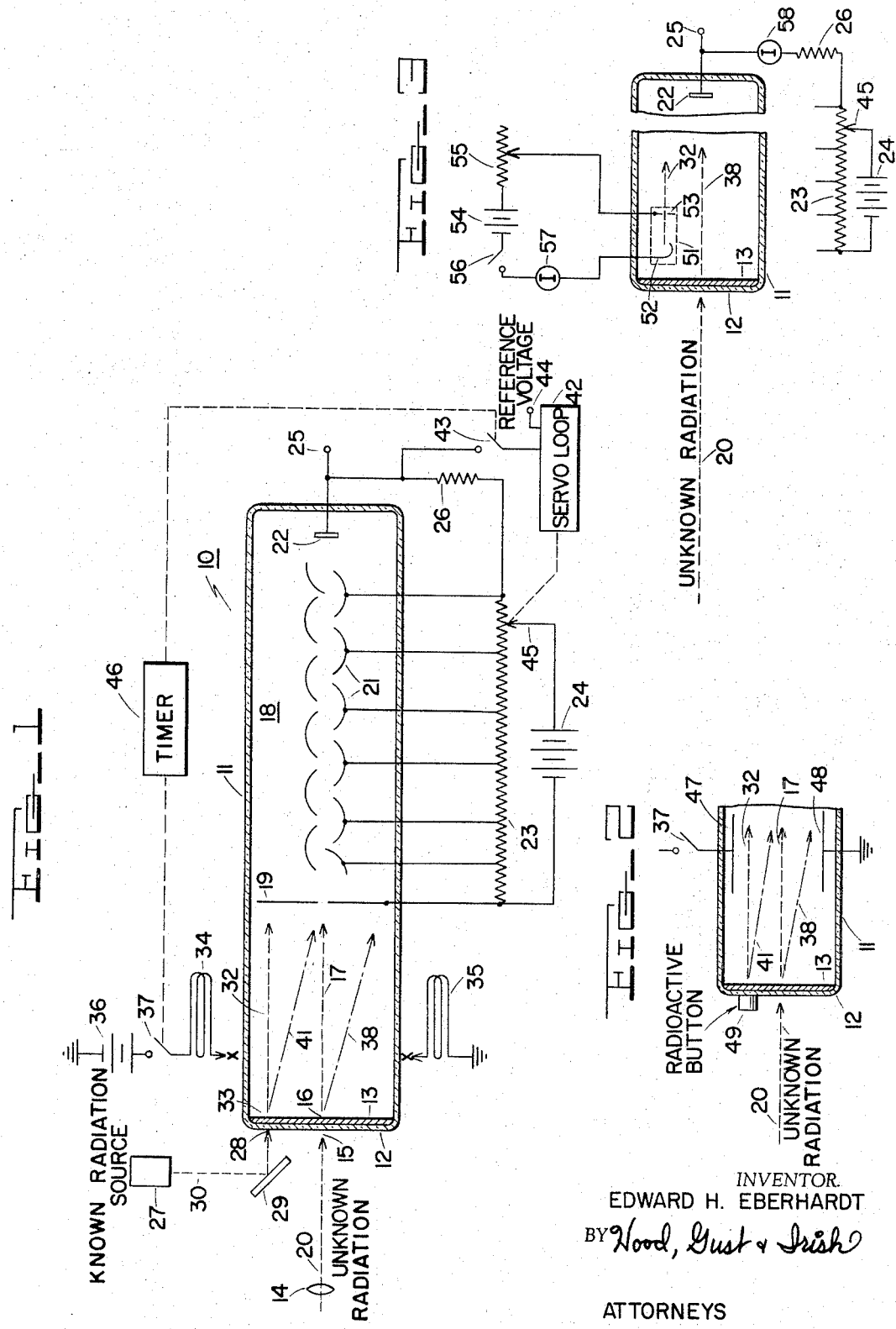

3,337,737
MULTIPLIER PHOTOTUBE WITH CALIBRATING ELECTRON BEAM
Edward H. Eberhardt, Fort Wayne, Ind., assignor to International Telephone and Telegraph Corporation, Nutley, N.J., a corporation of Maryland
Filed Apr. 10, 1963, Ser. No. 271,985
12 Claims. (Cl. 250—207)

This invention relates generally to multiplier phototubes, and more particularly to a system and method for calibrating multiplier phototubes.

Conventional multiplier phototubes comprise a photocathode adapted to receive radiation and convert the same into an electron beam, electron multiplying means including a plurality of dynode elements formed of or coated with secondary emissive material, means for applying progressively higher voltages to the dynode elements so that the electrons of the electron beam when injected into the low potential end of the multiplying means are multiplied upon dynode impact to provide cascade multiplication of electrons, a target electrode, and output circuit means coupled to the target electrode for providing an output signal responsive to the multiplied electron beam. Such multiplier phototubes are commonly employed for radioactive tracer analysis to distinguish between radioactive isotopes and in photometry for measuring low light levels.

Photomultiplier tubes are extremely sensitive and provide very high gain, however, the gain is critically dependent upon the voltage applied to the dynode elements, i.e., the gain will vary widely with a variation in the supply voltage, and also upon the secondary emissive characteristics of the dynode elements, which in turn is subject to variation due to such factors as temperature, fatigue, tube life, etc. For these reasons, the gain of conventional photomultiplier tubes tends to be unstable whereas in certain applications, such as those enumerated above, it is desirable that a highly stable gain be provided in order to insure accurate measurement of the input radiation or light level.

It is known to calibrate multiplier phototubes by exposing the photocathode to a source of light of known intensity and measuring the output current resulting therefrom. However, calibration by such methods is not accurate after any appreciable lapse of time due to subsequent voltage and temperature changes, etc.

It is accordingly an object of the invention to provide improved apparatus for calibrating multiplier phototubes.

Another object of the invention is to provide improved apparatus for rapidly calibrating and using multiplier phototubes.

A further object of the invention is to provide an improved method of rapidly calibrating and using multiplier phototubes.

In accordance with the broader aspects of the invention, means are provided for rapidly calibrating and using a multiplier phototube which includes a photocathode for receiving radiation of unknown intensity and to convert the same into a normal electron beam and electron multiplier means, the calibrating means comprising means for providing a second electron beam having a predetermined beam current and means for selectively deflecting the normal electron beam away from the multiplier means and the second beam onto the same.

The improved method of the invention, in its broader aspects, comprises the steps of providing a second electron beam having a predetermined electron beam current, periodically deflecting the normal beam away from the multiplying means and the second beam onto the same, measuring the output signal resulting from the multiplied second beam and adjusting the voltage supply means of the tube to provide a predetermined output signal in response to the second beam.

The above-mentioned and other features and objects of this invention and the manner of attaining them will become more apparent and the invention itself will be best understood by reference to the following description of an embodiment of the invention taken in conjunction with the accompanying drawings, wherein:

FIG. 1 is a diagram schematically illustrating one embodiment of the invention;

FIG. 2 is a fragmentary schematic illustration showing another embodiment of the invention; and FIG. 3 is a schematic illustration showing a further embodiment of the invention.

Referring now to FIG. 1, a conventional multiplier phototube is shown, generally identified at 10 and including an evacuated envelope 11 having a faceplate 12 which is transparent to the radiation being measured and which has a conventional photocathode 13 deposited on its inner surface. The radiation to be measured from a source of unknown intensity is focused as by a suitable lens 14, onto an input signal area 15 of the faceplate 12, as shown by dashed line 20, thereby causing a normal electron beam to be emitted from area 16 of the photocathode 13, as shown by the dashed line 17. Normal electron beam 17 is collimated and focused by conventional elements within the envelope 11 (not shown), as is well known to those skilled in the art.

A conventional electron multiplier assembly 18 is provided within the envelope 11 and comprises an apertured element 19, a plurality of secondary-emissive dynode elements 21, and a target electrode 22. Progressively higher voltages are applied to the apertured element 19 and the dynode elements 21 by voltage divider 23 coupled across a suitable source of direct current potential shown here as battery 24. Target electrode 22 is connected to output terminal 25 and to the high-potential end of the potentiometer 23 by a load resistor 26.

It will be readily understood that the electrons of the electron beam 17 which are injected into the low-potential end of the electron multiplier assembly 18 are multiplied upon dynode impact by reason of the secondary-emissive properties of the dynode elements 21, the resulting secondary electrons being accelerated toward the succeeding dynode stages where the multiplication process is repeated to provide he overall cascade multiplication of electrons and the resulting amplified output signal appearing across the load resistor 26.

It will be readily understood that the construction of the photomultiplier tube 10 thus far described is conventional and that other types of photomultiplier tubes well known to those skilled in the art may be employed.

In accordance with the invention, a source of radiation 27 having a standard constant intensity is provided, the radiation provided by the source 27 being directed onto a second area 28 of the faceplate 12 by means of a suitable mirror 29, as shown by the dashed line 30. Source 27 may be any standard radiation source such as a radioactive button.

Impingement of the calibrated radiation beam 30 upon the photocathode 16 provides a second electron beam, as shown by the dashed line 32, emitted from area 33 of the photocathode, beam 32 having a known constant beam current in response to the standard radiation beam 30 from the source 27. Under normal operating conditions when measuring the input radiation 20, electron beam 17 is injected into the electron multiplier 18 while the second standard electron beam 32 is spaced therefrom and parallel therewith, as shown, and is not injected into the electron multiplier.

In order to employ the calibrated electron beam 32 for calibrating the tube, conventional magnetic deflection coils 34, 35 are provided, coupled to a suitable source of energizing potential, shown as being a battery 36, by switch 37. When the switch 37 is closed thereby to energize the deflection coils 34, 35, electron beam 17 is deflected away from the aperture in element 19 as shown by the broken line 38, and the calibrated electron beam 32 is deflected through the aperture in the element 19 as shown by the broken line 41, and thus is injected into the electron multiplier 18. Thus, with switch 37 closed, the output signal appearing across the load resistor 26 is responsive to the calibrated electron beam 32 rather than to the electron beam 17 resulting from the unknown radiation 20.

In the illustrated embodiment, a conventional servo loop 42 is provided connected to a target electrode 22 by switch 43 and to a source 44 of reference voltage. Servo loop 42 is coupled to actuate adjustable element 45 of the voltage divider 23 thereby to vary the voltage applied thereto by the battery 24 and in turn the voltages applied to the dynode elements 21 and to the target electrode 22. Switch 43 is preferably actuated in unison with switch 37 at predetermined intervals by means of a suitable timer 46.

It will be readily understood that when switch 43 is closed, the output signal voltage responsive to the calibrated electron beam 32 is compared with the reference voltage to provide an error signal which is employed to actuate the movable element 45 of the voltage divider 23 to move the same in the proper direction to vary the output signal voltage so as to reduce the error signal to zero. When this has taken place, the tube is properly calibrated. Timer 46 may actuate switches 37 and 43 to calibrate the tube 10 as above described, at any desired intervals.

Referring now to FIG. 2 in which like elements are indicated by like reference numerals, it will be readily understood that electro-static deflection plates 47, 48 may be employed for deflecting the electron beams 17, 32 instead of the external magnetic deflection yoke 34, 35 as will be well known to those skilled in the art. Further, the standard radiation source may be applied directly to the exterior surface of the faceplate 12, as shown at 49.

Referring now to FIG. 3 in which like elements are still indicated by like reference numerals, the calibrated electron beam 32 may be provided by a conventional electron gun 51 disposed within the envelope 11 and comprising a cathode 52, such as that employed in a diode, and an apertured anode element 53.

Here, the desired predetermined beam current of the beam 32 is provided by a suitable source of potential, such as battery 54, having a variable resistor 55, switch 56 and ammeter 57, connected in series therewith across the cathode 52 and anode 53. Thus, with switch 56 closed, the proper current is provided by adjustment of the variable resistor 55.

In this embodiment, the automatic feedback adjustment of the adjustable element 45 of the voltage divider 23 is eliminated, the output signal current provided by the calibrating electron beam 32 being measured by ammeter 58 coupled in series with resistor 26, and the adjustable element 45 of the voltage divider 23 being manually adjusted until the predetermined output signal current is provided.

It will now be seen that with the improved calibrating apparatus and method of the invention, a multiplier phototube may be calibrated, when in use, as often as is necessary to compensate for drift and thus to provide the requisite stable gain.

While I have described above the principles of my invention in connection with specific apparatus, it is to be clearly understood that this description is made only by way of example and not as a limitation to the scope of my invention.

What is claimed is:

1. In a multiplier phototube having a photocathode adapted to receive radiation from a source of unknown intensity and to convert the same to a first electron beam, electron multiplying means including a plurality of dynode elements, voltage supply means for applying progressively higher voltages to said dynode elements thereby to multiply the electrons in said beam, a target electrode, and output circuit means coupled to said target electrode for providing an output signal responsive to the multiplied beam: means for calibrating said phototube comprising means for continuously providing a second electron beam in said tube simultaneously with said first beam and having a predetermined beam current, said second beam being normally directed away from said multiplier means, and means selectively deflecting both said first beam away from said multiplying means and said second beam onto the same so that only said second beam is multiplied.

2. The combination of claim 1 further comprising means for measuring the output signal responsive to said second beam.

3. The combination of claim 1 further comprising means for varying the voltage supplied by said voltage supply means in response to the output signal provided by the multiplied second beam.

4. The combination of claim 1 further comprising feedback loop means including means for comparing the output signal provided by the multiplied second beam with a reference signal, and means for varying the voltage supplied by said voltage supply means in response to said comparison.

5. The combination of claim 1 wherein said means for providing said second beam comprises another source of radiation of known intensity external to said tube and arranged to impinge upon said photocathode whereby said photocathode provides said second beam.

6. The combination of claim 1 wherein said means for providing said second beam comprises an electron gun disposed within said tube.

7. The combination of claim 1 wherein said tube includes an evacuated envelope having a faceplate portion with said photocathode formed on the inner surface thereof, said first beam being emitted from a first area of said photocathode, and wherein said means for providing said second beam comprises another source of radiation of known intensity external to said tube and arranged to impinge upon an area of said faceplate whereby said photocathode emits said second beam from a second area thereof.

8. The combination of claim 7 wherein said other source of radiation is disposed adjacent said faceplate.

9. The combination of claim 7 wherein radiation from said other source is reflected onto said faceplate by mirror means.

10. In a multiplier phototube having a photocathode adapted to receive radiation from a source of unknown intensity and to convert the same to a first electron beam, electron multiplying means including a plurality of dynode elements, voltage supply means for applying progressively higher voltages to said dynode elements thereby to multiply the electrons in said beam, a target electrode, and output circuit means coupled to said target electrode for providing an output signal responsive to the multiplied beam: means for calibrating said phototube comprising means for continuously providing a second electron beam in said tube simultaneously with said first beam and having a predetermined beam current, said second beam being normally directed away from and not impinging upon said multiplying means; means selectively deflecting both said first beam away from said multiplying means and said second beam onto the same so that only said second beam is multiplied; means for selectively varying the voltage supplied by said voltage supply means to said dynode elements; and feedback means selectively coupled to said output circuit means and to said varying means for actuating the same in response to the output signal provided by the multiplied second beam.

11. The combination of claim 10 further comprising first switching means for selectively actuating said deflecting means, and second switching means for selectively coupling said feedback means to said output circuit means.

12. The combination of claim 11 further comprising timing means for actuating said first and second switching means in unison at predetermined intervals.

References Cited

UNITED STATES PATENTS

| | | | |
|---|---|---|---|
| 2,198,233 | 4/1940 | Snyder | 250—207 |
| 2,292,847 | 8/1942 | Rajchman | 313—95 |
| 2,304,755 | 12/1942 | Zworykin | 250—207 X |
| 2,412,423 | 12/1946 | Rajchman et al. | 250—207 |
| 2,772,368 | 11/1956 | Scherbatskoy | 250—207 |
| 3,042,805 | 7/1962 | Boersma | 250—207 |
| 3,056,885 | 10/1962 | Scherbatskoy | 250—83 |

RALPH G. NILSON, *Primary Examiner.*

E. STRICKLAND, J. D. WALL, *Assistant Examiners.*